E. D. WHITE.
SAFETY CONTROLLING DEVICE FOR STREET CARS.
APPLICATION FILED AUG. 23, 1909.
954,710.
Patented Apr. 12, 1910.
2 SHEETS—SHEET 1.
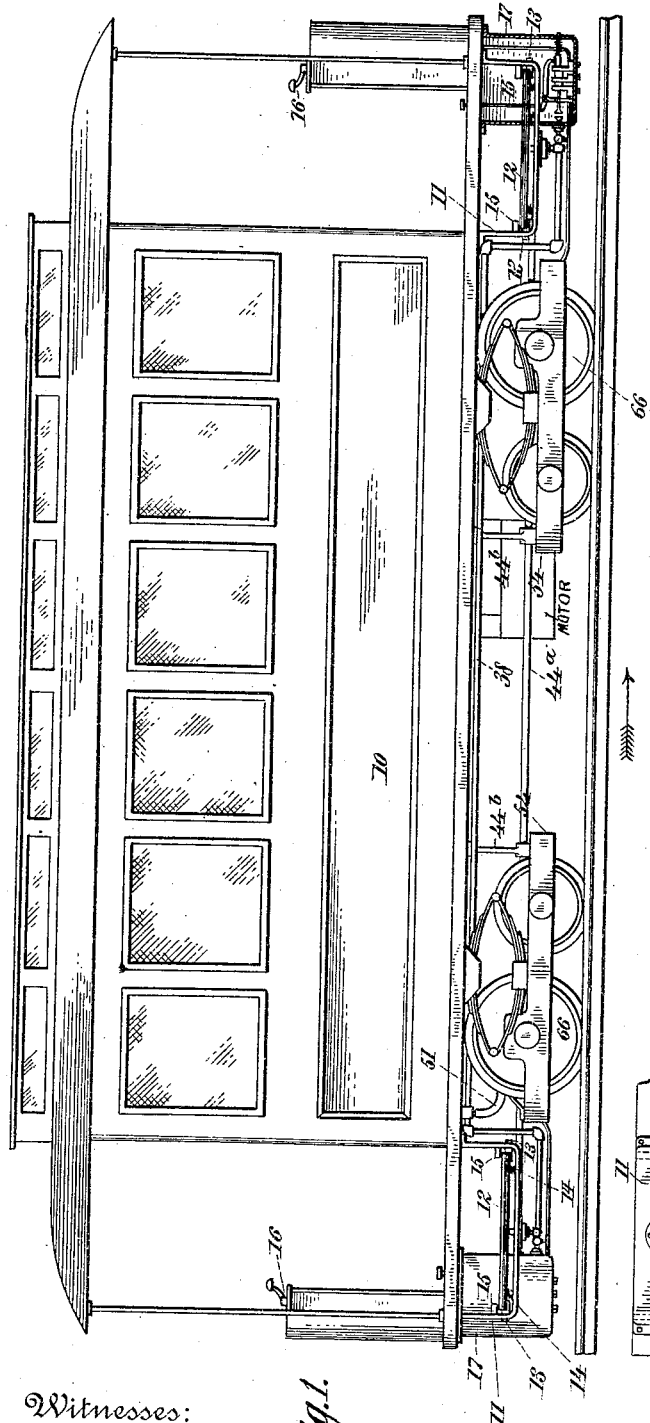
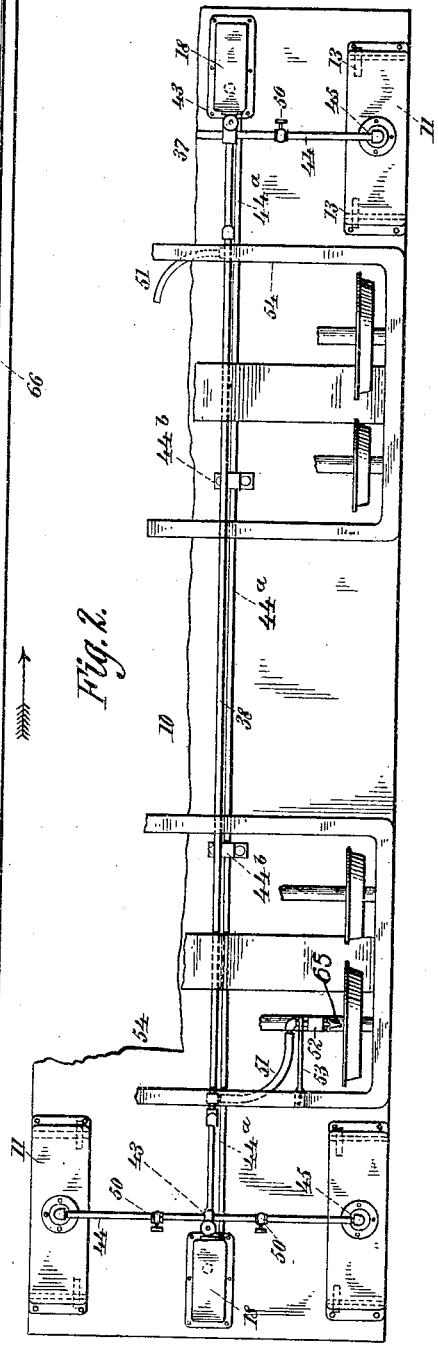
Witnesses:
John H. Lynch
George Pambay
Elijah D. White, Inventor
By his Attorney
Conrad A. Dieterd E. D. WHITE.
SAFETY CONTROLLING DEVICE FOR STREET CARS.
APPLICATION FILED AUG. 23, 1909.
954,710.
Patented Apr. 12, 1910.
2 SHEETS—SHEET 2.
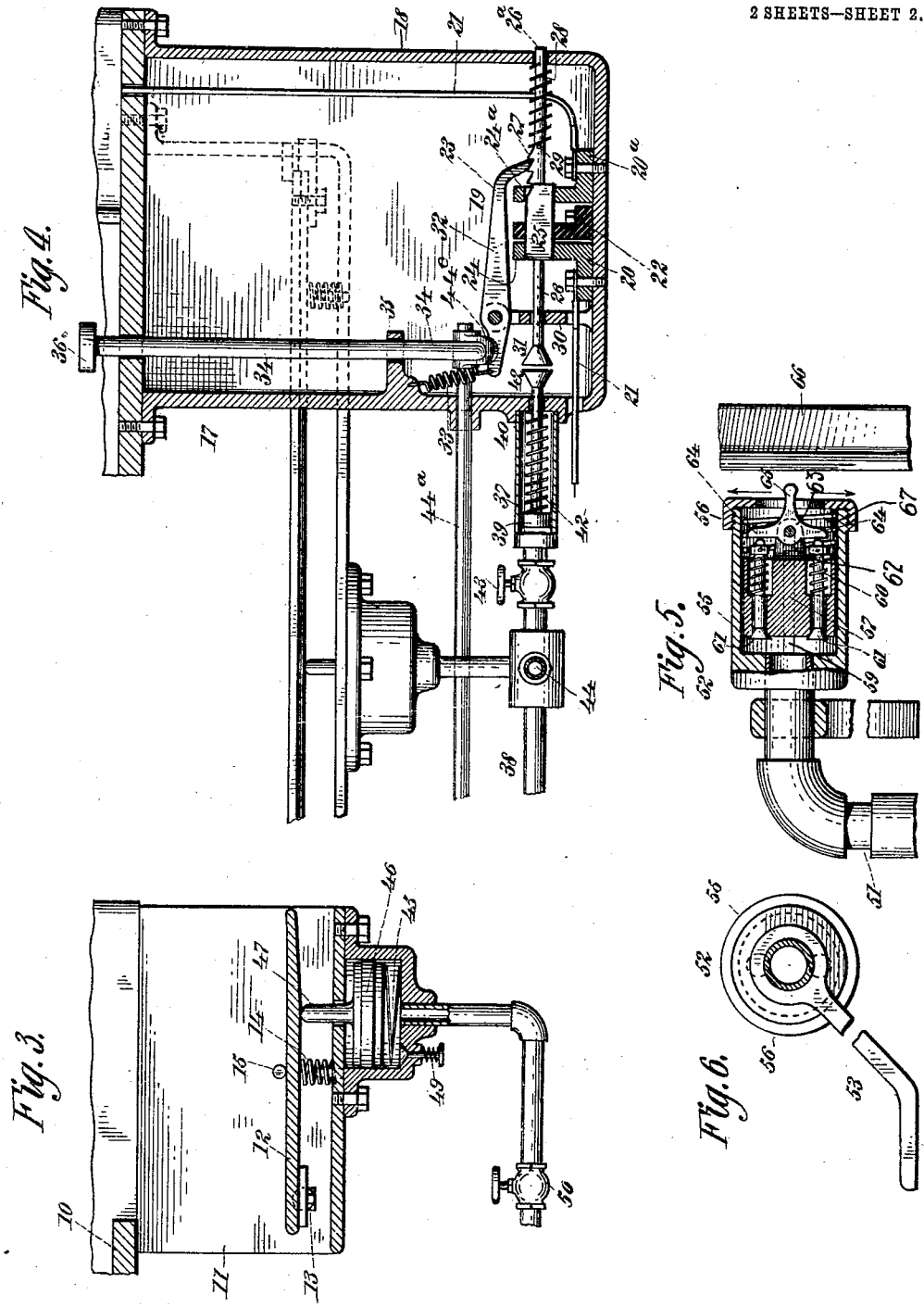

UNITED STATES PATENT OFFICE.

ELIJAH D. WHITE, OF NEW YORK, N. Y.

SAFETY CONTROLLING DEVICE FOR STREET-CARS.

954,710.  Specification of Letters Patent.  Patented Apr. 12, 1910.

Application filed August 23, 1909. Serial No. 514,201.

*To all whom it may concern:*

Be it known that I, ELIJAH D. WHITE, a citizen of the United States, residing at the city of New York, borough of Brooklyn, Kings county, in the State of New York, have invented certain new and useful Improvements in Safety Controlling Devices for Street-Cars, of which the following is a full, clear, and exact specification.

My invention relates to safety appliances for street cars, and the same has for its object more particularly to provide a simple, efficient and reliable apparatus whereby the propelling mechanism of a car will be rendered inoperative while a passenger is passing over the steps thereof.

Further, said invention has for its object to provide means for interrupting the car motor circuit during the time a passenger is bearing any weight whatever upon the car steps.

Further, said invention has for its object to provide means for automatically preventing the premature starting of a car while a passenger is in the act of boarding or leaving the same.

To the attainment of the aforesaid objects and ends my invention consists in the novel details of construction, and in the combination, connection and arrangement of parts hereinafter more fully described and then pointed out in the claims.

In the accompanying drawings forming part of this specification, wherein like numerals of reference indicate like parts, Figure 1 is a side view of a street car with a safety appliance constructed according to, and embodying my invention applied thereto; Fig. 2 is a partial inverted bottom view of the car; Fig. 3 is an enlarged transverse section of one of the car steps and the operating means thereon; Fig. 4 is an enlarged detail central section of one of the circuit controlling devices, and operating means therefor; Fig. 5 is an enlarged detail top view, partly in section, showing a portion of a car wheel, and a valve adapted to be operated thereby, and Fig. 6 is an end view of the valve shown at Fig. 5, and the supporting means therefor.

In said drawings 10 designates a street car of usual general construction provided with steps 11, 11 each of which is provided with a movable tread 12 pivotally secured at its rear edge upon trunnions 13, 13 supported in the sides of said step. The forward edge of said tread is free and supported in an elevated position upon springs 14, 14, and 15, 15 denote studs arranged upon the opposite sides of said step adapted for contact with the upper surfaces of said tread 12 whereby to limit the upward movement thereof.

16 16 denotes motor controllers arranged upon the platforms at the opposite ends of the car, and 17 17 denote safety controlling devices arranged upon the under sides of the car platforms each comprising a casing 18 secured to the under side of the car in which casing is arranged a circuit breaking device 19. Said circuit breaking device comprising a pair of separated vertical contact members 20 $20^a$ secured to the base of said casing 18 and connected to conductors 21 $21^a$ leading respectively to the car motor and one of the controllers 16. Intermediate said contact members 20, $20^a$ is secured an insulating support 22 which is provided with an opening 23 arranged in alinement with openings 24, $24^a$ provided in the contact members 20, $20^a$.

25 denotes a movable contact member arranged upon the contacts 20 $20^a$ and the insulating support 22 and movable within the openings arranged therein. To the opposite ends of said movable contact member 25 are secured rods 26 $26^a$ which are insulated therefrom. The rod $26^a$ has its outer end supported in the casing 18, and upon its inner end is provided a rack 27. 28 denotes a spring disposed upon said rod $26^a$ intermediate the inner side of the casing 18 and a pin 29 on said rod whereby to maintain said movable contact member 25 normally in engagement with the contacts 20 20 and close the portion of the circuit intermediate the controller 16 and the car motor. The outer or free end of the rod 26 is supported in a bearing 30 and is provided with an enlarged head 31.

32 denotes a detent pivotally mounted in the upper end of the bearing 30 to the outer end of which is secured one end of a spring 33 having its other end secured to said casing 18 whereby to maintain the free end of said detent in engagement with the rack 27 on said movable contact member 25. 34 denotes a plunger disposed in a guide 35 arranged upon the inner side of said casing 18 and having its lower end bearing upon the outer end of the detent 32 intermediate the spring 33 and the bearing 30. The upper end of said plunger extends through an aperture in the car platform and is provided with a head 36.

Upon the rear side of each casing 18 adjacent to its base is secured a cylindrical casing 37, and 38 denotes a longitudinal pipe arranged upon the underside of the car and secured at its opposite ends to said cylindrical casings 37 37. Within each casing 37 is provided a piston 39 having a piston rod 40 extending therefrom and into the casing 18, and provided at its outer end, which is disposed within said casing 18, with a head 41 arranged adjacent to the head 31 on the rod 26 of the movable contact member 25.

42 denotes a spring disposed upon the piston rod 40 intermediate the piston 39 and the outer side of the casing 18.

43 43 denote valves arranged in the longitudinal pipe 38 whereby either of the safety controlling devices 17 17 may be disconnected according to the direction in which the car is intended to travel.

44 44 denote branch pipes connected to the longitudinal pipe 38 adjacent to its opposite ends and intermediate the valves 43 43 thereon. The outer ends of one set of said branch pipes extend to points directly below the steps at the front platform, and the outer ends of the other set of said pipes extend to points directly below the steps at the rear platform.

44ª denotes a longitudinal shaft supported in bearings 44ᵇ secured to the underside of the car 10. Said shaft 44ª has its ends extending into the casing 18 18 and provided at its ends with lateral projections or toes 44ᶜ 44ᶜ having their outer or free ends arranged below the lower ends of the plungers 34 34, and resting upon the outer ends of the detents 32 32. Upon the underside of said car steps are secured large cylindrical casings 45 45 which are connected to the ends of the branch pipes 44 44, and in said casings are arranged pistons 46 46 having rods 47 47 extending upwardly therefrom and through openings in the steps, and the extreme ends of said rods 47 47 in contact with the under sides of the movable tread portions 12 12 with which said rods are held normally in engagement by coil-springs 48 48 arranged in said casings 45 45 intermediate the bases thereon and the undersides of said pistons 46 46. 49 49 denote check valves provided in said casings 45 45 to permit air to enter said casings during the ascent of the pistons 46 46 therein. 50 50 denote valves arranged in said branch pipes 44 44 whereby either of said casings 45 45 when not in operative connection may be disconnected. 51 51 denote additional flexible branch pipes connected at their inner ends to the longitudinal pipe 38, intermediate the branch pipes 44 44, and provided at their outer ends with automatic valves 52 52 supported upon brackets 53 53 secured to the trucks 54 54. Each of said valves comprises a casing 55 provided at its outer end with a flanged collar 56 and within said casing is arranged a movable cylindrical member 57 provided with a longitudinal groove engaging a spline 59 within the casing 55. The movable member 57 is provided with two longitudinal openings 60 60 in which are arranged inwardly opening spring-pressed valves 61 61. The movable member 57 is also provided intermediate the openings 60 60 with a bearing 62 in which is pivotally mounted a double bell crank lever 63 having its opposite horizontal ends 64 64 adapted to engage the ends of the valves 61 61, and the end of its intermediate member 65 adapted to engage the inner surface of a car wheel 66 when said movable member 57 is projected under the influence of either of the pistons 46 working in the casings 45 upon the under sides of the car steps, and 67 denotes a coil-spring arranged in said casing intermediate the collar 56 thereon and the forward end of said movable member 57 to restore the same to its initial position.

The operation of the apparatus is as follows:—If we assume the car, as shown in Fig. 1, to be going to the right, the safety controlling device 17 arranged below the front platform only should be maintained in operation, and to this end the valve 43 in the longitudinal pipe 38 adjacent to the rear safety controlling device 17 should be closed, also the valves 50 50 in the branch pipes 44 leading to the front and rear steps at the inner side of the car should be closed. If the front step at the outer side of the car is not to be used then the valve 50 in the branch pipe 44 should also be closed. If we assume further that the several parts of the apparatus are in the positions shown at Figs. 3, 4 and 5, and the car to be at rest to permit a passenger to board the car or alight therefrom during which period the car motor is cut out by the action of the motorman operating the controller 16, then just as soon as the passenger places his foot upon the movable tread 12 of the rear end step (left hand end Fig. 1) he will depress the plunger 46 within the casing 45 below said rear step, and compress the air therein and cause the same to project the movable member 57 in the valve 52 and force the end 65 of bell-crank lever 63 into engagement with the inner surface of the wheel 66 adjacent to its periphery. At the same time the piston 39 in the cylinder 37 of the forward controlling device 17 will be forced outward and the end 41 of its rod 40 caused to engage the head 31 of the rod 26 of the circuit closing device 19 and break the circuit between the contacts 24 24ª; the part 25 being held out of contact by the detent 32 engaging the rack 27.

Should the motorman attempt to start the car while the passenger has any of his weight upon the step, the piston 37 cannot resume its normal position, and the circuit-closing device 19 will maintain the operating circuit broken. As soon as the motorman, however, receives his signal, after the passenger has left the car or gained the platform he is only required to depress the plunger 34 and thus release the detent 32 from the rack 27. The circuit-closing device 19 will thus again complete the motor circuit as the part 25 engages both contacts 20, 20$^a$.

Should a passenger place his weight or any part thereof upon the step while the car is in motion the motor circuit will not in that event be interrupted owing to the fact that the member 65 of the bell-crank lever 63 arranged upon the movable member 57 of the valve 52 will be forced into engagement with the wheel 66 and as said wheel rotates it will move the member 65 of said bell-crank in either direction as indicated by the arrows at Fig. 5, according to the direction of movement of said wheel 66 and in so doing cause one of the members 64 of said bell-crank 63 to open one of the valves 61 and release the air in the pipe system before the same can actuate the piston 39 in the casing 37 which piston is retarded by a spring 42 offering a greater degree of resistance to the movement of said piston than the springs of the valves 61 61 actuated by the ends of said bell-crank lever 63.

It will, of course, be obvious that instead of rendering the apparatus operative from the rear step of the car only, as above described, the same may be operated from both the rear and front steps at one side of the car or from all four steps, this being readily controlled by the valves in the pipe system arranged below the car, and further that the motor circuit may be completed from either end of the car by depressing the plungers 34 34, as the lower ends thereof bear upon the toes or projections 44$^c$ 44$^c$ of the longitudinal shaft 44$^a$, and as the said shaft is partially rotated the toes or projections 44$^c$ 44$^c$ will depress the detents 32 32 and cause the part 25 again to engage the 20, 20$^a$.

Having thus described my invention, what I claim and desire to secure by Letters Patent is:

1. The combination with a car platform having a step, a movable member upon said step, car operating means, and pneumatic means controlled by the action of said movable member for rendering the car operating means inoperative, substantially as specified.

2. The combination with a car and operating means therefor, of a car step, pneumatic means for controlling said car operating means, and means on said step for actuating said pneumatic means, substantially as specified.

3. The combination with a car step, of a movable tread carried thereby, means for holding said tread in an elevated position, a circuit closer controlled by said tread in its movement, means for operating the car, and pneumatic means for actuating said circuit closer to render said car operating means inoperative, substantially as specified.

4. The combination with an electrically propelled car, a circuit for leading current into the same, of a step provided with a tread portion, a pneumatic controlling device therefor, operated by said tread portion, for actuating said circuit closer to interrupt the car circuit, substantially as specified.

5. The combination with a car provided with an electric motor for operating the same, and an electric circuit including said motor, of a step provided with a movable tread, a circuit closer, pneumatic means controlled by said tread in its movement for actuating said circuit closer for breaking said motor circuit, substantially as specified.

6. The combination with a car having an electric motor for operating the same, an electric circuit including said motor, of a step, a circuit closer, a compression device on said step, means connecting said compression device and circuit closer, and means arranged upon said step for actuating said compression device to control said circuit closer, substantially as specified.

7. The combination with a car having an electric motor for operating the same, an electric circuit including said motor, of a step, a circuit closing device, means for operating said circuit closing device, a compression device on said step, means connecting said compression device with the means for operating said circuit closing device, and means on said step for actuating said compression device to control said circuit closer, substantially as specified.

8. The combination with a car having an electric motor for operating the same, an electric circuit including said motor, of a step, a circuit closer, pneumatic means for operating said circuit closer comprising a pump, means arranged upon said step for actuating said pump, a cylinder, a pipe connecting said cylinder and pump, a piston in said casing adapted to engage said circuit closer under the influence of said pump to control said circuit closer, substantially as specified.

9. The combination with a car having an electric motor for operating the same, an electric circuit including said motor, of a step, a circuit closer, pneumatic means for operating said circuit closer comprising a pump, means arranged upon said step for actuating said pump, a cylinder supported adjacent to said circuit closer, a pipe connecting said cylinder and pump, a piston in said cylinder adapted to engage said circuit closer to break the motor circuit under influence of said pump, and means for securing said circuit closer in position to maintain said circuit broken, substantially as specified.

10. The combination with a car having an electric motor for operating the same, an electric circuit including said motor, of a step, a circuit closer, pneumatic means for operating said circuit closer comprising a pump, means arranged upon said step for actuating said pump, a cylinder supported adjacent to said circuit closer, a pipe connecting said cylinder and pump, a piston in said cylinder adapted to engage said circuit closer to break the motor circuit under influence of said pump, means for securing said circuit closer in position to maintain said circuit broken, and means for releasing said securing means, substantially as specified.

11. The combination with a car having a motor for operating the same, an electric circuit including said motor, of a step, a circuit closer, a pump secured to said step, a movable member on said step for actuating said pump, a cylinder supported adjacent to said circuit closer, a pipe connecting said pump and cylinder, a piston in said cylinder adapted to engage said circuit closer under the influence of said pump to break the motor circuit, means for securing said circuit closer in position to maintain said circuit broken, and means operated by the car wheel adapted to prevent the interrupting of the motor circuit while the car is in motion, substantially as specified.

12. The combination with a car having a motor for operating the same, an electric circuit including said motor, of a step, a movable member thereon, a circuit closer, a pump secured to said step adapted to be operated by said movable member, a cylinder supported adjacent to said circuit closer, a pipe connecting said pump and cylinder, a spring-pressed piston in said cylinder adapted to engage said circuit closer under the influence of said pump to break the motor circuit, means for securing said circuit closer in position to maintain said circuit broken, means for releasing said securing means to restore said circuit closer, a relief valve, a pipe connecting said relief valve with the pipe connecting said pump and cylinder, a lever on said valve adapted to engage a car wheel, and means for projecting said lever into engagement with a car wheel whereby to open said relief valve when the car is in motion, substantially as specified.

13. The combination with a car having a motor for operating the same, an electric circuit including said motor, of a step, a movable member thereon, a circuit closer, a pump secured to said step adapted to be operated by said movable member, a cylinder supported adjacent to said circuit closer, a pipe connecting said pump and cylinder, a spring-pressed piston in said cylinder adapted to engage said circuit closer under the influence of said pump to break the motor circuit, means for securing said circuit closer in position to maintain said circuit broken, means for releasing said securing means to restore said circuit closer, a relief valve comprising a casing, a pipe connecting said casing with the pipe connecting said pump and cylinder, a spring-pressed movable member arranged in said casing, valves arranged in said movable member, a lever on said movable member adapted for contact with said valves and a car wheel whereby to open one of said valves when the car is in motion, substantially as specified.

14. The combination with a car having a motor for operating the same, an electric circuit including said motor, of a step, a movable member thereon, a circuit closer comprising fixed and movable parts, a pump secured to said step adapted to be operated by said movable member, a cylinder supported adjacent to said circuit closer, a pipe connecting said pump and cylinder a spring-pressed piston in said cylinder adapted to engage the movable part of said circuit closer under the influence of said pump to break the motor circuit, detents for securing said movable contact parts of each circuit closer in position to maintain said circuit breaker, a shaft, projections on said shaft engaging said detents, plungers arranged in contact with said projections for releasing said movable contact parts to restore said circuit, a relief valve comprising a casing, a pipe connecting said casing with the pipe connecting said pump and cylinder, a spring-pressed movable member arranged in said casing, valves in said movable member, a lever on said movable member adapted for contact with said valves and car wheel whereby to open one of said valves when the car is in motion, substantially as specified.

15. A circuit closer comprising a casing, a pair of fixed contact members arranged therein, and a movable contact member adapted to engage the same, a rack on said movable contact member, a spring for maintaining the same normally in engagement with said fixed contact members, a second casing, a spring retarded piston is said second casing adapted to shift said movable contact member, a spring-pressed detent adapted to engage said rack to hold said movable contact member in position to maintain a circuit broken, and a plunger arranged in said first casing for actuating said detent whereby to release the same of its engagement with said rack and restore said movable contact member, substantially as specified.

Signed at the city of New York, in the county and State of New York, this 25th day of June, nineteen hundred and nine.

ELIJAH D. WHITE.

Witnesses:
 CONRAD A. DIETERICH,
 GEO. L. WHEELOCK.